US009398633B2

United States Patent
Batchu et al.

(10) Patent No.: US 9,398,633 B2
(45) Date of Patent: Jul. 19, 2016

(54) METHODS AND APPARATUS FOR LOW POWER TRACKING OF NETWORK SYSTEM TIMING FOR LONG PAGING CYCLES

(71) Applicant: QUALCOMM Incorporated, San Diego, CA (US)

(72) Inventors: Bhaskara Viswanadham Batchu, Medak (IN); Troy Russell Curtiss, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 14/228,096

(22) Filed: Mar. 27, 2014

(65) Prior Publication Data

US 2015/0282247 A1 Oct. 1, 2015

(51) Int. Cl.
*H04W 76/04* (2009.01)
*H04W 52/02* (2009.01)
*H04W 56/00* (2009.01)
*H04W 4/00* (2009.01)

(52) U.S. Cl.
CPC ........ *H04W 76/048* (2013.01); *H04W 52/0216* (2013.01); *H04W 56/001* (2013.01); *H04W 56/003* (2013.01); *H04W 4/005* (2013.01); *H04W 76/046* (2013.01)

(58) Field of Classification Search
CPC ............ H04W 76/048; H04W 56/003; H04W 56/001; H04W 52/0216
See application file for complete search history.

(56) References Cited

U.S. PATENT DOCUMENTS

| 8,260,328 B1 | 9/2012 | Yellin et al. |
| 2007/0064662 A1 | 3/2007 | Bultan et al. |
| 2013/0176873 A1 | 7/2013 | Ji et al. |
| 2013/0301501 A1 | 11/2013 | Olvera-Hernandez et al. |
| 2013/0329616 A1 | 12/2013 | Attar |
| 2014/0022909 A1 | 1/2014 | Mahmoud et al. |
| 2014/0023162 A1 | 1/2014 | Kent |

FOREIGN PATENT DOCUMENTS

EP 2621242 A1 7/2013

OTHER PUBLICATIONS

Interdigital Communications: "Triggering synchronisation for online MTC devices", 3GPP Draft; S2-112555_MTC_SYNC_AT-TACHED, 3rd Generation Partnership Project (3GPP), Mobile Competence Centre; 650, Route Des Lucioles; F-06921 Sophia-Antipolis Cedex; France, vol. SA WG2, No. Xi 'An; 20110516, May 11, 2011, pp. 1-3, XP050525534.

(Continued)

*Primary Examiner* — Jackie Zuniga Abad
(74) *Attorney, Agent, or Firm* — Knobbe Martens Olson & Bear LLP

(57) ABSTRACT

Methods and apparatus for of tracking network system timing are provided. In one aspect, a method of tracking network system timing comprises determining a periodicity of a plurality of windows for monitoring mobile messages. The method further includes performing a time tracking adjustment between the windows. The method further includes monitoring for mobile messages exclusively within each of the windows.

20 Claims, 5 Drawing Sheets

(56) References Cited

OTHER PUBLICATIONS

Interdigital Communications: "Synchronisation between MTC device and MTC server/3GPP core network", 3GPP Draft; S2-111798 MTC Sync, 3rd Generation Partnership Project (3GPP), Mobile Competence Centre; 650, Route Des Lucioles; F-06921 Sophia-Antipolis Cedex; France, vol. SA WG2, No. Bratislava; 20110411, Apr. 6, 2011, pp. 1-5, XP050524686.

International Search Report and Written Opinion—PCT/US2015/019993—ISA/EPO—Jul. 1, 2015.

METHODS AND APPARATUS FOR LOW POWER TRACKING OF NETWORK SYSTEM TIMING FOR LONG PAGING CYCLES

BACKGROUND

1. Field

Certain aspects of the present disclosure generally relate to wireless communication systems, and more particularly, to methods and apparatus for low power tracking of wireless network system timing for long paging cycles.

2. Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), a neighborhood aware network (NAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Certain devices operating in a network may not need to frequently connect with the network to deliver or receive data. Accordingly, the network or a base station (BS) may assign a long discontinuous reception (DRX) cycles or sleep lengths or slot cycle index (SCI). However, long DRX/SCI cycles may result in devices losing network timing information. Accordingly, there is a need for devices to track system timing information when operating in long DRX/SCI cycles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of tracking network system timing. The method includes determining a periodicity of a plurality of windows for monitoring mobile messages. The method further includes performing a time tracking adjustment between the windows. The method further includes monitoring for mobile messages exclusively within each of the windows.

Another aspect of the disclosure provides an apparatus for wireless communication. The apparatus includes a processor configured to determine a periodicity of a plurality of windows for monitoring mobile messages, perform a time tracking adjustment between the windows, and monitor for mobile messages exclusively within each of the windows.

Another aspect of the disclosure provides an apparatus for wireless communication. The apparatus includes means for determining a periodicity of a plurality of windows for monitoring mobile messages. The apparatus further includes means for performing a time tracking adjustment between the windows. The apparatus further includes means for monitoring for mobile messages exclusively within each of the windows.

Another aspect of the subject matter described in the disclosure provides a non-transitory computer-readable medium including code that, when executed, causes a wireless communication apparatus to determine a periodicity of a plurality of windows for monitoring mobile messages. The medium further includes code that, when executed, causes the apparatus to perform a time tracking adjustment between the windows. The medium further includes code that, when executed, causes the apparatus to monitor for mobile messages exclusively within each of the windows.

DETAILED DESCRIPTION

Figure 1:
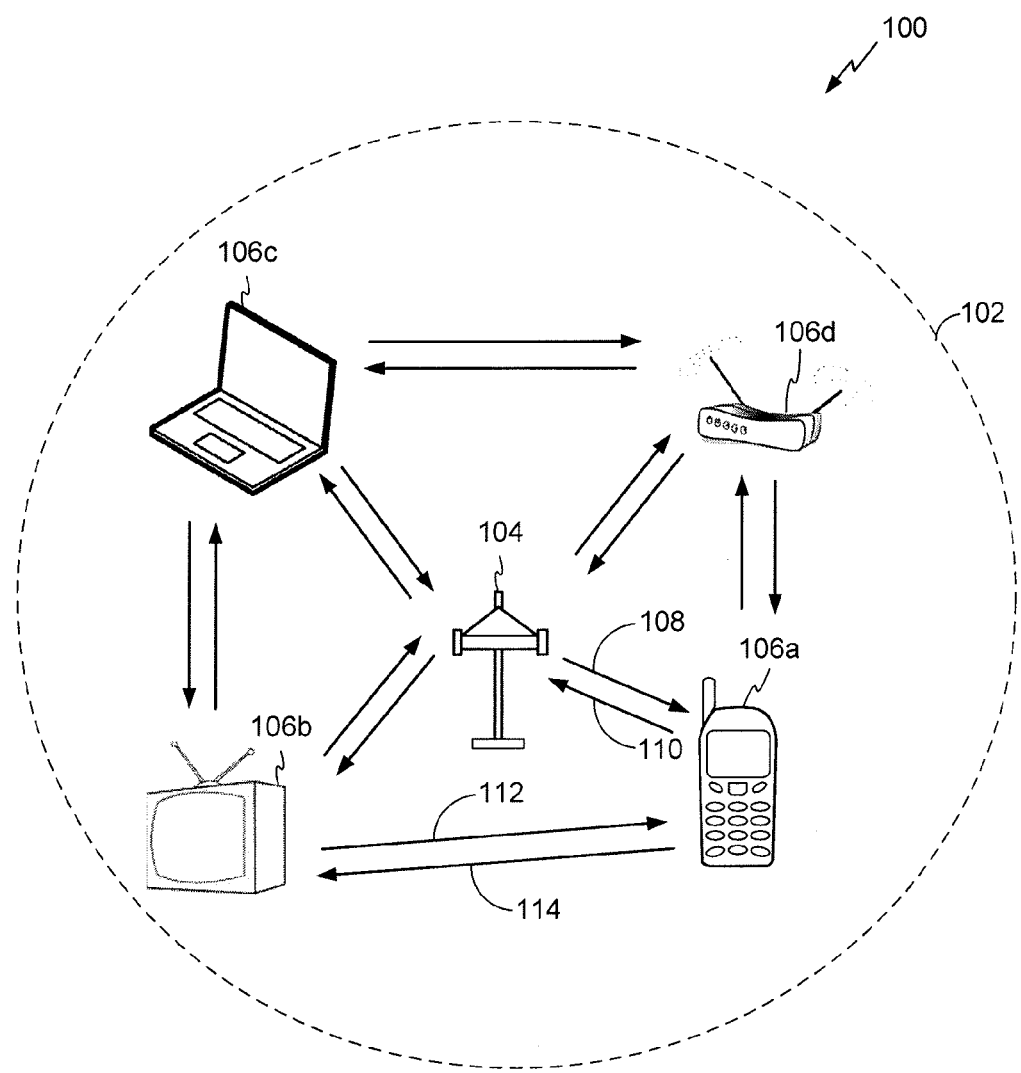
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Wireless network technologies can include various types of wireless local area networks (WLANs). A WLAN can be used to interconnect nearby devices together, employing widely used networking protocols. However, the various aspects described herein can apply to any communication standard, such as a wireless protocol. The various aspects described herein can apply to any communication standard, such as the Institute of Electrical and Electronic Engineers (IEEE) 802.11 wireless protocols. For example, the various aspects described herein can be used as part of the IEEE 802.11a, 802.11b, 802.11g, 802.11n, and/or 802.11ah protocols. Implementations of the 802.11 protocols can be used for sensors, home automation, personal healthcare networks, surveillance networks, metering, smart grid networks, intra- and inter-vehicle communication, emergency coordination networks, cellular (e.g., 3G/4G) network offload, short- and/or long-range Internet access, machine-to-machine (M2M) communications, etc.

In some implementations, a WLAN includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, a wearable computing device (e.g., a watch), an appliance, a sensor, a vending machine, etc. In an example, a STA connects to an AP via a WiFi (e.g., IEEE 802.11 protocol) compliant wireless link to obtain general connectivity to the Internet or to other wide area networks. In some implementations a STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Wireless devices, such as a group of STAs, for example, can be used for neighborhood aware networking (NAN), or social-WiFi networking. For example, various stations within the network can communicate on a wireless device to wireless device (e.g., peer-to-peer communications) basis with one another regarding applications that each of the STAs supports. It is desirable for a discovery protocol used in a social-WiFi network to enable STAs to advertise themselves (e.g., by sending discovery packets) as well as discover services provided by other STAs (e.g., by sending paging or query packets), while ensuring secure communication and low power consumption. It should be noted that a discovery packet can also be referred to as a discovery message or a discovery frame. It should also be noted that a paging or query packet can also be referred to as a paging or query message or a paging or query frame.

FIG. 1 illustrates an example of a wireless communication system 100 in which aspects of the present disclosure can be employed in accordance with an embodiment. The wireless communication system 100 can operate pursuant to a wireless standard, such as an 802.11 standard. The wireless communication system 100 can include an AP 104, which communicates with STAs 106. In some aspects, the wireless communication system 100 can include more than one AP. Additionally, the STAs 106 can communicate with other STAs 106. As an example, a first STA 106a can communicate with a second STA 106b. As another example, a first STA 106a can communicate with a third STA 106c although this communication link is not illustrated in FIG. 1.

A variety of processes and methods can be used for transmissions in the wireless communication system 100 between the AP 104 and the STAs 106 and between an individual STA, such as the first STA 106a, and another individual STA, such as the second STA 106b. For example, signals can be sent and received in accordance with OFDM/OFDMA techniques. If this is the case, the wireless communication system 100 can be referred to as an OFDM/OFDMA system. Alternatively, signals can be sent and received between the AP 104 and the STAs 106 and between an individual STA, such as the first STA 106a, and another individual STA, such as the second STA 106b, in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

A communication link can be established between STAs, such as during social-WiFi networking in a NAN. Some possible communication links between STAs are illustrated in FIG. 1. As an example, a communication link 112 can facilitate transmission from the first STA 106a to the second STA 106b. Another communication link 114 can facilitate transmission from the second STA 106b to the first STA 106a.

The AP 104 can act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
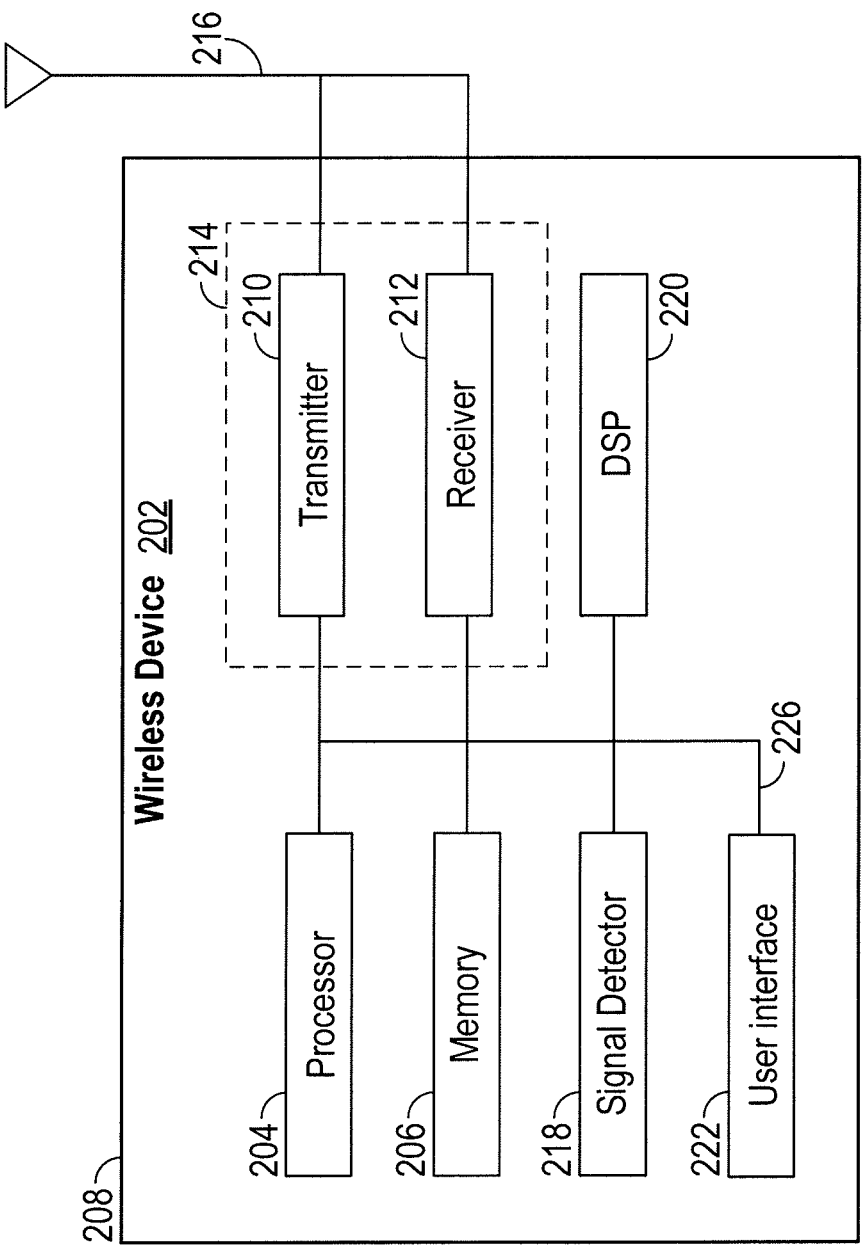
FIG. 2 illustrates various components that may be utilized in a wireless device that may be employed within the wireless communication system of FIG. 1.

FIG. 2 illustrates various components that can be utilized in a wireless device 202 that can be employed within the wireless communication system 100 in accordance with an embodiment. The wireless device 202 is an example of a wireless device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 106, the processor 204 can be configured to process packets of a plurality of different packet types. For example, the processor 204 can be configured to determine the type of packet and to process the packet and/or fields of the packet accordingly. When the wireless device 202 is implemented or used as an AP 104, the processor 204 can also be configured to select and generate one of a plurality of packet types. For example, the processor 204 can be configured to generate a discovery packet comprising a discovery message and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can comprise a physical layer data unit (PPDU).

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user. The wireless device can further comprise a battery (not shown) to power the wireless device.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Some mobile networks may be optimized for machine-to-machine (M2M) communications and may be less optimal for human-to-human communications. M2M devices may include wireless transmit/receive units, appliances (e.g., refrigerators, dishwashers, laundry machines, etc.), metering devices, vending machines, or the like that may access the network less frequently than devices used for human-to-human use. The M2M devices may be wireless sensors or the like that may be deployed to remote areas for monitoring tasks or other tasks, where there may be limited access to power. M2M devices may not be requested to listen to network signaling or network paging for long periods. In some cases, M2M device battery life may be expected to last for an extended period of time, such as a number of years.

For power saving purposes, a device may shut down or sleep for a long period of time, which may be scheduled, and may not listen to a network during this scheduled period of time. After this period is over, the device may wake up and may listen to signals, such as M2M downlink paging signals, triggering signals, reaching signals, or the like and may monitor mobile directed messages. This may be done, for example, to determine if the network wishes to communicate with the device. During wake up, the device may also perform a time tracking adjustment by reacquiring the network or pilot signal and adjusting the device timing accordingly. Additionally, the device may also perform a channel condition adjustment by reacquiring the network or pilot signal and adjusting the device channel condition accordingly. Monitoring for mobile directed messages or other signals and performing a time tracking adjustment may be referred to a "full wakeup" and such monitoring for mobile directed messages may occur exclusively during the full wakeup.

An extended sleeping or shut down period may be referred to as a long DRX/SCI cycle. A long DRX/SCI cycle may be a cycle length of a day, week, month, or other period. A device that operates at a long DRX/SCI cycle may wake up with misaligned timing or may completely lose the network timing due to thermal variations in the crystal oscillator or varying channel conditions or other conditions that may cause timing drift.

Certain aspects of the present disclosure support allowing devices to wake up at certain intervals within a long DRX/SCI cycle to perform timing adjustments, channel adjustments, or both, without monitoring for mobile directed messages or other signals, to improve efficiency. Waking up without monitoring for mobile directed messages or other signals may be referred to as a "cheap wakeup." The cheap wakeups may alleviate timing and reacquisition issues for long DRX/SCI cycles. Accordingly, in the case of M2M devices that only wake up every week, month, or other extended period, these M2M devices may experience less timing drift from the network timing and may experience fewer losses of the network timing or the active network pilot signal, thereby improving performance.

Figure 3:
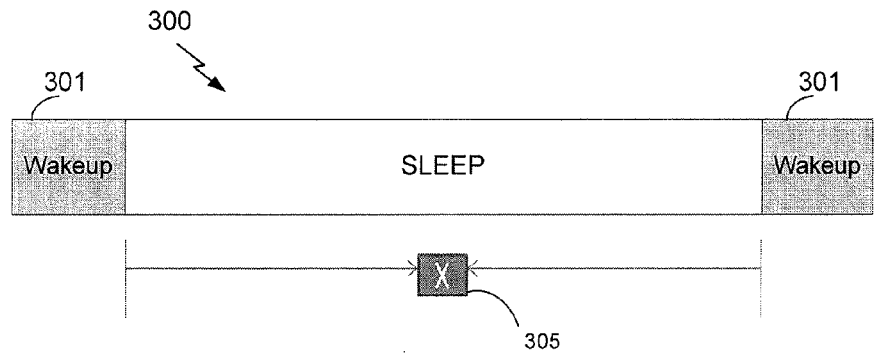
FIG. 3 is a time sequence diagram of an exemplary DRX/SCI wakeup cycle.
Figure 4:
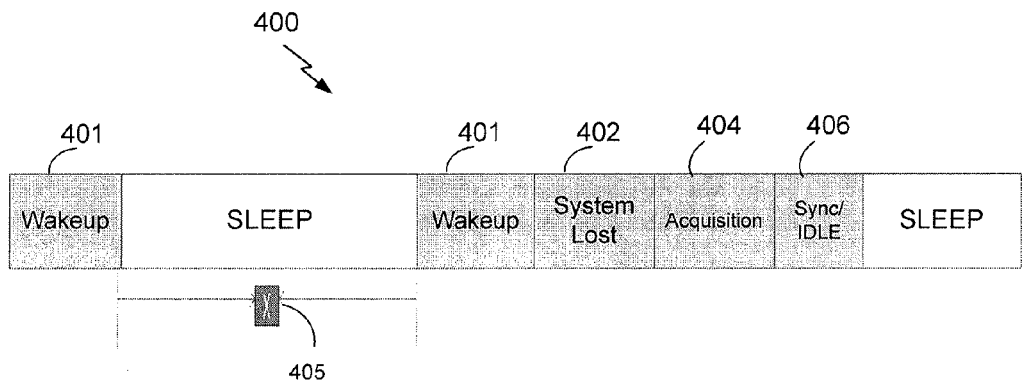
FIG. 4 is a time sequence diagram of an exemplary DRX/SCI wakeup cycle.

FIG. 3 is a diagram of an exemplary DRX/SCI cycle 300. In this embodiment, a device may wake up every X 305 period and perform a full wake up procedure (i.e., monitor mobile directed messages). As discussed above, this type of DRX/SCI cycle may cause timing misalignment and loss of the network pilot signal. FIG. 4 is a diagram of an exemplary DRX/SCI cycle 400 that has lost the network timing or system. In an embodiment, the device may wake up during time 401 after a sleep state, attempt to reacquire the system network, and discover it has lost the system during the time 402. The device may then undergo an acquisition procedure during time 404 to reacquire the pilot signal. The device may then sync its time with the pilot signal and then remain idle during time 406 and before entering sleep mode. The net effect of losing the system is that the device remains awake during periods 401, 402, 404, and 406 instead of just the wakeup 401 time which may consume more power.

Figure 5:
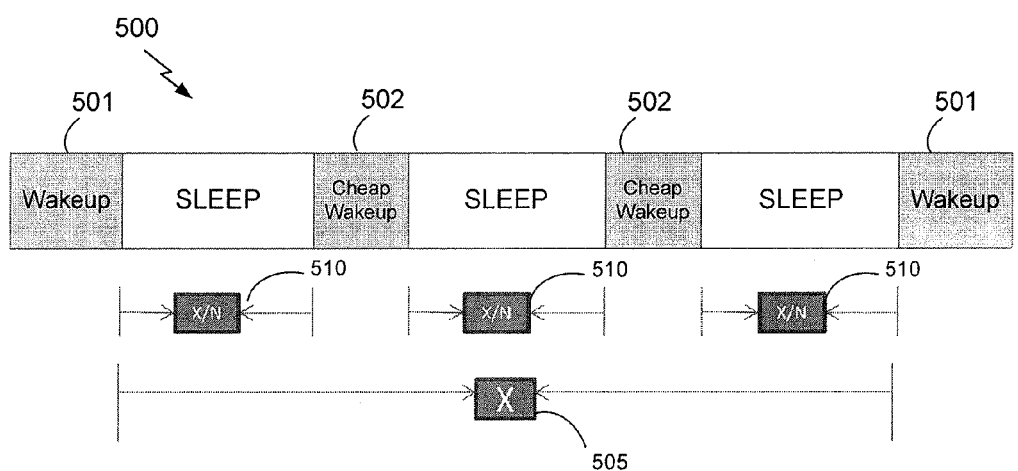
FIG. 5 is a time sequence diagram of an exemplary DRX/SCI wakeup cycle with cheap wakeups.

FIG. 5 is a diagram of an exemplary DRX/SCI cycle 500 utilizing a cheap wake up. In one embodiment the wakes up at periodicity of (X/N) 510 where N is a variable based on the last measured timekeeping accuracy and channel conditions. In one aspect, N is an integer in [1 . . . to some positive integer<=network assigned DRX/SCI cycle value]. In another embodiment, N is a number less than the DRX/SCI cycle value (X 505) such that the device performs a cheap wakeup 510 within the periodicity X 505. When the device wakes up at wakeups 501 of purely X 505 periodicity, it performs a full wake up (i.e., a full mobile directed message monitoring cycle). When the device wakes up outside of the X 505 periodicity, it may perform a cheap wakeup. To optimize the device wakeup outside of X 505 periodicity (one of the other N-1 wakeups 502 in the X/N 510 cycles), the device performs a cheap wakeup 502 (i.e., only a time tracking adjustment) by reacquiring the network, and then immediately goes back to sleep without the usual mobile directed message monitoring procedure performed exclusively during a full wakeup (i.e., a full wakeup 501). A possible benefit of using the cheap wakeup 501 in a long DRX/SCI cycle may be that the device time tracking stays accurate enough for high fidelity time tracking at (X) cycle wakeup 501 where a mobile directed messages might be present, and the power consumed during the N-1 cheap wakeups 502 may be less than the full wakeup 501.

In some embodiments, the device effectively tracks two different DRX/SCI cycles. One longer DRX/SCI cycle (i.e., X 505) that is used to monitor mobile directed messages, and another smaller DRX/SCI (i.e., X/N 510) cycle that is used to cheaply (in terms of power) track network timing and channel conditions.

Figure 6:
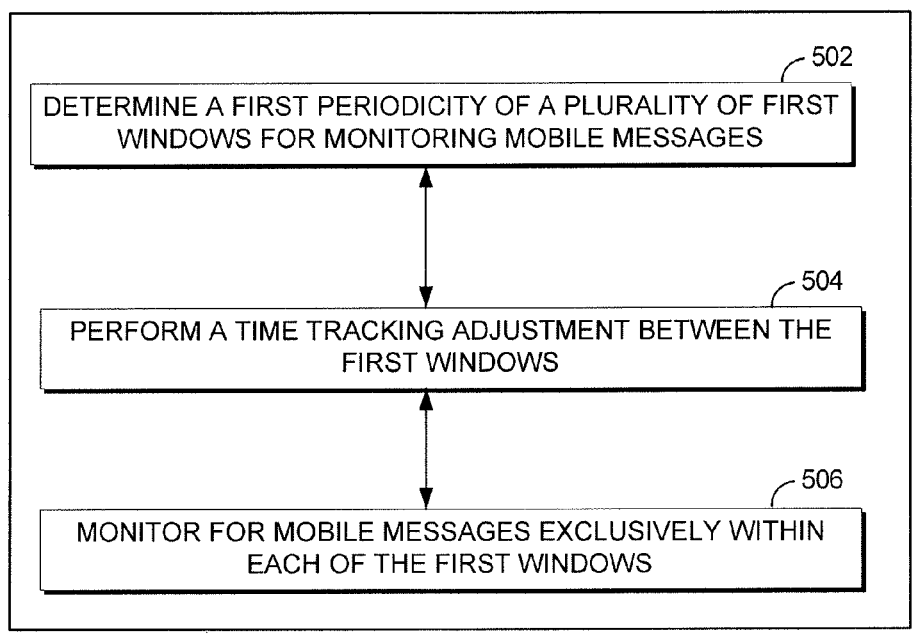
FIG. 6 is a flow chart of an exemplary method for tracking network system timing.

FIG. 6 is a flow chart of an exemplary method 600 for tracking network system timing. In certain embodiments, the method 600 can be performed by a wireless device 202, such as but not limited to a processor 204, DSP 220, and a transmitter 210 of a wireless device 202. Although the method 600 in FIG. 6 is illustrated in a particular order, in certain embodiments the blocks herein may be performed in a different order, or omitted, and additional blocks can be added. A person of ordinary skill in the art will appreciate that the process of the illustrated embodiment may be implemented in any wireless device that can be configured to process and transmit a generated message.

At operation block 602, a wireless device 202 may determine a periodicity of a plurality of windows for monitoring mobile messages. At block 604, the wireless device 202 may perform a time tracking adjustment between the windows. At block 606, the wireless device 202 may monitor for mobile messages exclusively within each of the windows. In certain embodiments, the method may further comprise the wireless device 202 determining a second periodicity of a plurality of second windows for performing the time tracking adjustment, the second periodicity shorter than the periodicity for monitoring mobile messages.

Figure 7:
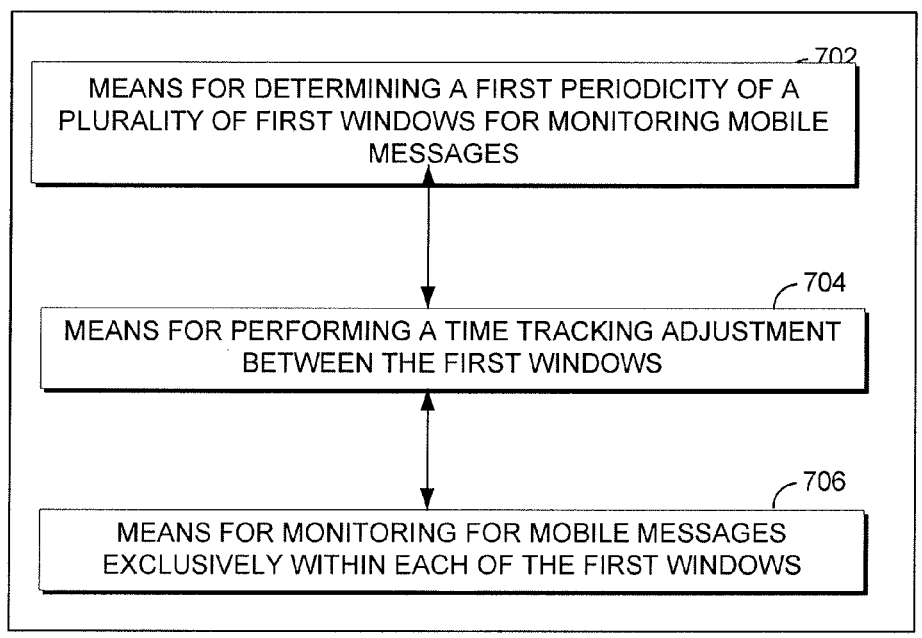
FIG. 7 is a functional block diagram of a wireless device that can be employed to perform a method of FIG. 6 in the wireless communication system of FIG. 1.

FIG. 7 is a functional block diagram of a wireless device that can be employed to perform a method of FIG. 6 in the wireless communication system of FIG. 1. Those skilled in the art will appreciate that the apparatus 700 may have more components than the simplified block diagrams shown in FIG. 7. FIG. 7 includes only those components useful for describing some prominent features of implementations within the scope of the claims.

The wireless device 700 can include a means 702 for determining a periodicity of a plurality of windows for monitoring mobile messages. In certain embodiments, the means 702 for determining a message can be configured to perform one or more of the functions with respect to block 602 (FIG. 6). In various embodiments, the means 602 for determining a periodicity can be implemented by a processor 204 or DSP 220 (FIG. 2). The wireless device 700 further includes means 704 for performing a time tracking adjustment between the windows. In certain embodiments, the means 704 for performing can be configured to perform one or more of the functions described above with respect to block 604 (FIG. 6). In various embodiments, the means 704 for performing can be implemented by a processor 204 or DSP 220 (FIG. 2). The wireless device 700 further includes means 706 for monitoring for mobile messages exclusively within each of the windows. In certain embodiments, the means 706 for monitoring can be configured to perform one or more of the functions described above with respect to block 606 (FIG. 6). In various embodiments, the means 706 for monitoring can be implemented by a receiver 212, a signal detector 218, a processor 204 or DSP 220 (FIG. 2).

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In some aspects, wireless signals may be transmitted utilizing various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of performing low power wake ups for maintaining synchronization with network timing comprising:
   performing a full power wake up in each of a plurality of first windows, wherein performing a full power wake up includes performing a full message monitoring procedure; and
   perform a low power wake up in each of a plurality of second windows, wherein performing a low power wake up includes performing a time tracking adjustment for maintaining synchronization with network timing without performing the full message monitoring procedure;
   wherein the plurality of first windows has a first periodicity, wherein the plurality of second windows has a second periodicity, wherein the second periodicity is determined by dividing the first periodicity by an integer, the integer being a value between 1 and a discontinuous reception/slot cycle index (DRX/SCI) value, and wherein each second window occurs between two first windows.

2. The method of claim 1, wherein the second periodicity comprises a fraction of the first periodicity.

3. The method of claim 1, wherein performing the time tracking adjustment comprises reacquiring a pilot signal.

4. The method of claim 1, wherein the performing the time tracking adjustment comprises reacquiring a pilot signal during one or more of the plurality of second windows.

5. The method of claim 1, further comprising entering a sleep mode between the first windows and the second windows.

6. An apparatus for wireless communication, comprising:
a processor configured to:
perform a full power wake up in each of a plurality of first windows, wherein performing a full power wake up includes performing a full message monitoring procedure; and
perform a low power wake up in each of a plurality of second windows, wherein performing a low power wake up includes performing a time tracking adjustment for maintaining synchronization with network timing without performing the full message monitoring procedure;
wherein the plurality of first windows has a first periodicity, wherein the plurality of second windows has a second periodicity, wherein the second periodicity is determined by dividing the first periodicity by an integer, the integer being a value between 1 and a discontinuous reception/slot cycle index (DRX/SCI) value, and wherein each second window occurs between two first windows.

7. The apparatus of claim 6, wherein the second periodicity comprises a fraction of the first periodicity.

8. The apparatus of claim 6, wherein performing the time tracking adjustment comprises reacquiring a pilot signal.

9. The apparatus of claim 6, wherein performing the time tracking adjustment comprises reacquiring a pilot signal during one or more of the plurality of second windows.

10. The apparatus of claim 6, wherein the processor is further configured to enter a sleep mode between the first windows and the second windows.

11. An apparatus for wireless communication, comprising:
means for performing a full power wake up in each of a plurality of first windows, wherein performing a full power wake up includes performing a full message monitoring procedure; and
means for performing a low power wake up in each of a plurality of second windows, wherein performing a low power wake up includes performing a time tracking adjustment for maintaining synchronization with network timing without performing the full message monitoring procedure;
wherein the plurality of first windows has a first periodicity, wherein the plurality of second windows has a second periodicity, wherein the second periodicity is determined by dividing the first periodicity by an integer, the integer being a value between 1 and a discontinuous reception/slot cycle index (RX/SCI) value, and wherein each second window occurs between two first windows.

12. The apparatus of claim 11, wherein the second periodicity comprises a fraction of the first periodicity.

13. The apparatus of claim 11, wherein the means for performing the time tracking adjustment comprises means for reacquiring a pilot signal.

14. The apparatus of claim 11, wherein the means for performing the time tracking adjustment comprises means for reacquiring a pilot signal during one or more of the plurality of second windows.

15. The apparatus of claim 11, further comprising means for entering a sleep mode between the first windows and the second windows.

16. A non-transitory computer-readable medium comprising code that, when executed, causes a processor to:
perform a full power wake up in each of a plurality of first windows, wherein performing a full power wake up includes performing a full message monitoring procedure; and
perform a low power wake up in each of a plurality of second windows, wherein performing a low power wake up includes performing a time tracking adjustment for maintaining synchronization with network timing without performing the full message monitoring procedure;
wherein the plurality of first windows has a first periodicity, wherein the plurality of second windows has a second periodicity, wherein the second periodicity is determined by dividing the first periodicity by an integer, the integer being a value between 1 and a discontinuous reception/slot cycle index (DRX/SCI) value, and wherein each second window occurs between two first windows.

17. The medium of claim 16, wherein the second periodicity comprises a fraction of the first periodicity.

18. The medium of claim 16, wherein performing the time tracking adjustment comprises reacquiring a pilot signal.

19. The medium of claim 16, wherein performing the time tracking adjustment comprises reacquiring a pilot signal during one or more of the plurality of second windows.

20. The medium of claim 16, further comprising code that, when executed, causes a processor to enter a sleep mode between the first windows and the second windows.

* * * * *